United States Patent [19]
Bergman

[11] 3,855,096
[45] Dec. 17, 1974

[54] ELECTROCHEMICAL CELLS
[75] Inventor: Imanuel Bergman, Sheffield, England
[73] Assignee: National Research Development Corporation, London, England
[22] Filed: May 4, 1972
[21] Appl. No.: 250,246

[30] Foreign Application Priority Data
May 6, 1971 Great Britain.................... 13463/71

[52] U.S. Cl............ 204/195 P, 204/1 T, 204/195 R
[51] Int. Cl. ............................................ G01n 27/46
[58] Field of Search............. 204/1 T, 195 P, 195 R, 204/195 T

[56] References Cited
UNITED STATES PATENTS

| | | | |
|---|---|---|---|
| 3,455,807 | 7/1969 | Jacobson et al. ............... | 204/195 R |
| 3,131,133 | 4/1964 | Barendrecht........................ | 204/1 T |
| 3,498,888 | 3/1970 | Johansson ...................... | 204/195 T |
| 3,542,662 | 11/1970 | Hicks et al. ..................... | 204/195 P |
| 3,239,444 | 3/1966 | Heldenbrand................... | 204/195 P |
| 2,928,774 | 3/1960 | Leisey............................ | 204/195 T |
| 3,296,113 | 1/1967 | Hansen .......................... | 204/195 R |
| 3,503,861 | 3/1970 | Volpe............................. | 204/195 P |

Primary Examiner—T. Tung
Attorney, Agent, or Firm—Cushman, Darby & Cushman

[57] ABSTRACT

An electrochemical cell for detecting and measuring an oxidisable or reducible substance in a fluid in which cell the background current is substantially compensated by providing in the cell first and second working electrodes and a counter electrode all in contact with an electrolyte, the first working electrode also being exposed to the fluid, the current through the first working electrode being measured, and the current through the second working electrode which includes the background current being maintained at a constant level.

Optionally, the second working electrode may be exposed to a reference fluid, and desirably the current through it may be controlled by an operational amplifier.

11 Claims, 4 Drawing Figures

ELECTROCHEMICAL CELLS

This invention relates to electrochemical cells.

In this specification and claims the term "electrochemical cell" will refer to a cell having an electrode at which an "active species" can transfer electrons, i.e., at which the active species is oxidisable or reducible. If the cell is arranged so that the active species diffuses to the electrode at such a rate that the electrode passes a current which is a function of that rate, i.e., if the electrode current is diffusion limited, then the electrochemical cell will be referred to as a polarographic cell. If, however, the cell is arranged so that fluid containing the active species flows past the electrode at which substantially all of the active species is oxidised or reduced, then the current passed by the electrode is a function of the active species flux reaching the cell and the cell will be referred to as a coulometric cell.

A typical polarographic curve is illustrated in FIG. 4 of the drawing filed with this specification. The curve 74 relates to the reduction of oxygen to hydroxyl ion and has four distinct regions A, B, C and D. A curve 76 for nitrogen is also shown.

In region A of curve 74 the available electrons are not energetic enough for any significant electron transfer to take place and the current is low. In region B, as the voltage increases an increasing proportion of oxygen molecules reaching the electrode are reduced to hydroxyl ions and the current-voltage curve follows a rising, sigmoid portion. Region C is the "diffusion current plateau"; all oxygen molecules reaching the electrode are reduced to hydroxyl ions, the current is limited by the rate of diffusion of oxygen to the electrode and is virtually independent of voltage. In the absence of oxygen there is little current, as shown by the curve for nitrogen. In region D the aqueous solvent breaks down to give off hydrogen and the background current rises, as shown by the nitrogen curve.

An electrochemical cell may be used to detect the presence in a fluid of an active substance which causes a small electric current to flow in the cell. In such circumstances it is desirable to minimise the background current in the cell which may be due for example, to evolution of oxygen or hydrogen from an aqueous electrolyte, to the formation of chlorine from a chloride ion or to corrosion of the working electrode.

The effect of such a background current on quantitative measurements has been substantially eliminated by the use of two identical cells, one of which is exposed to the fluid under test while the other is exposed to a reference fluid. The difference between the currents flowing in the two cells then gives a measure of the difference in concentrations of the active substance between the fluid under test and the reference fluid. However, it has been found difficult to match the cells exactly, which is essential if quantitative measurements are required, and in addition, the background current varies with temperature so that accurate temperature control or compensation is needed.

It is an object of the present invention to provide an electrochemical cell for measuring small concentrations of active substances in which matching of two cells is not required, and any change in background current due to change in temperature and other factors is automatically compensated substantially completely.

According to the invention an electrochemical monitoring system for detecting the presence of an active substance in a fluid comprises an electrochemical cell having a first working electrode in contact with an electrolyte and exposed also to the fluid, a second working electrode in contact with the electrolyte and a counter-electrode in contact with the electrolyte, means for measuring the current through said first working electrode, and feedback means for automatically adjusting the potential of the counter electrode such that the current through the second working electrode is maintained at a substantially constant magnitude.

Preferably the first working electrode is a detecting electrode at which an oxidisable or reducible substance in said fluid can be oxidised or reduced to provide an electric current of magnitude related to the concentration of said substance and which current flows through said detecting electrode, and the second working electrode is a compensating electrode through which will flow any background current not related to the concentration of said active substance. Substantially the same background current, in addition to the current related to the concentration of active substance, will also flow through the detecting electrode.

Optionally the second working electrode is exposed to a reference fluid.

Optionally the electrochemical cell may be a gas-monitoring cell and optionally the detecting and compensating electrodes may be metallised membrane electrodes.

Preferably the electrical potential applied to the counter electrode is controlled from the output of an operational amplifier having a negative feedback circuit, the differential input of the amplifier being derived from a resistor in series with the second working electrode, whereby substantially zero current passes through the second working electrode. Optionally, the differential input of the amplifier may also be derived from a steady source of electrical potential arranged in opposition to the potential derived from the resistor in series with the second working electrode, whereby the operational amplifier allows a substantially steady current to be passed through the second working electrode.

In one application of the present invention the electrochemical cell may be arranged to be a polarographic cell and the electrical potential applied to the counter electrode may be such that the polarographic cell operates in region C of FIG. 4.

In another application of the present invention the electrochemical cell may be arranged to be a coulometric cell and the electrical potential applied to the counter electrode may be such that the coulometric cell operates either in region C of FIG. 4, or, provided the fluid containing the active species passes sufficiently slowly past a large surface area electrode in the cell for all the active species to be removed at the electrode, in region B of FIG. 4. An example of such a cell is the Hersch cell described by P. Hersch at the 11th Detroit Anachem Conference in October 1963.

For both a polarographic cell and a coulometric cell, the magnitude of the current through the second working electrode may be chosen so that, in the absence of the active species, the variation with temperature of that current is minimised and an acceptable signal-to-noise ratio is achieved.

In an electrochemical cell arranged according to the invention, the difference between the currents passed by the detecting and compensating electrodes is proportional to the concentration of the active substance in the gas under test to which the first working electrode is exposed, or to the difference in concentrations of the active substance in the gas under test and in the reference gas to which the compensating electrode is exposed.

If the electrochemical cell is being used to measure eg a gas at low partial pressure of the order of parts per million, the difference between the currents will be of the order of nanoamps. The potential applied to the detecting and compensating electrodes may be such that the background current due to the applied potential is of the same order, unless the background current, which may be cathodic or anodic, is more stable at a higher level.

It is an advantage of an electrochemical cell according to the present invention that the only requirement for matching the detecting and compensating electrodes is that over the working temperature range of the cell and at the potential applied to these electrodes, the background currents shall be similar, that is to say, the currents when neither electrode is exposed to the polarographically active substance.

Another advantage is that the "settling down" period is minimised. This is a period which is found necessary with cells described in the prior art to allow the background current to become stabilised.

It is a further advantage that the effect of temperature changes on the magnitude of the background current is substantially eliminated.

Yet another advantage is that it is possible to maintain the background current of the working electrodes at a chosen current level when the first electrode is not exposed to an active substance. This may be desirable eg if the electrodes are catalytically active electrodes through which a small anodic or cathodic current must be passed continuously in order to maintain the activity of the electrode.

The invention will now be described by way of example only with reference to the drawings filed with the specification in which.

Figure 1:
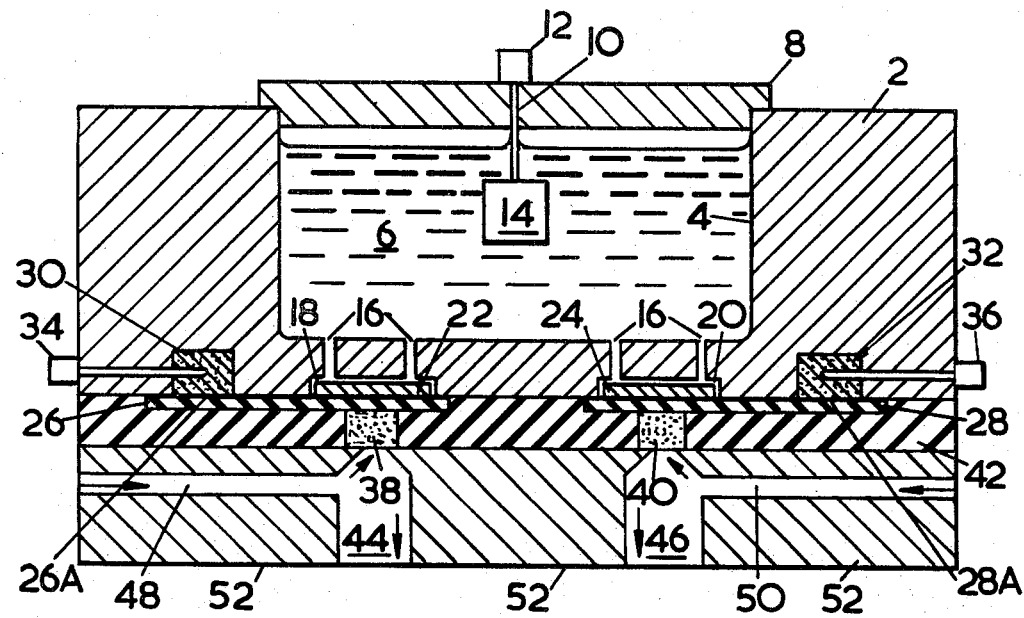
FIG. 1 illustrates a section through a first embodiment of a gas-monitoring polarographic cell.

In FIG. 1, a polarographic cell comprises a body part 2 having a cavity 4 containing an electrolyte 6. The cavity 4 is closed by a lid 8 which holds an electrical connecting wire 10 connected to a terminal 12 and to a suitable counter electrode 14 immersed in the electrolyte 6.

The bottom of the cavity 4 is connected through channels 16 to first and second recesses 18, 20 containing dialysis membranes 22, 24 respectively, which are in contact with the metallised upper faces of first and second metallised membranes 26, 28. The metallised faces 26A, 28A, of the membranes 26, 28 form respectively the detecting or first working electrode and the compensating or second working electrode of the cell and are connected respectively through contacts 30, 32 to terminals 34, 36 on the outside of the cell body 2.

The lower faces of the membranes 26, 28 are in contact with first and second gas porous plugs 38, 40 held in position by a rubber gasket 42 which also retains the membrane electrodes 26, 28. The lower face of the porous plug 38 communicates with the passage 44 which in turn communicates with the gas inlet passage 48. Similarly the lower face of the porous plug 40 communicates with the passages 46 and 50. The passages 44, 46, 48 and 50 are machined in a metal retaining disc 52 which holds the rubber gasket 42 in position and is connected to the cell body 2 by conventional means not shown.

In operation, the electrical contacts 12, 34, 36 are connected into an electrical circuit (see FIG. 3), so that detecting and compensating electrodes 26A, 28A respectively are held at the same electrical potential. Some of the electrolyte 6 is absorbed by the dialysis membranes 22, 24 which then form salt bridges and provide ionic electrically conducting paths between the counter electrode 14 and the membrane electrodes 26A, 28A. A gas to be monitored is caused to flow through the gas inlet passage 48 and outlet passage 44. Some diffuses through the porous plug 38 to the metallised membrane 26. Similarly, a reference gas is caused to flow through the gas inlet passage 50 and passage 46 to diffuse through the porous plug 40 to the metallised membrane 28.

Figure 3:
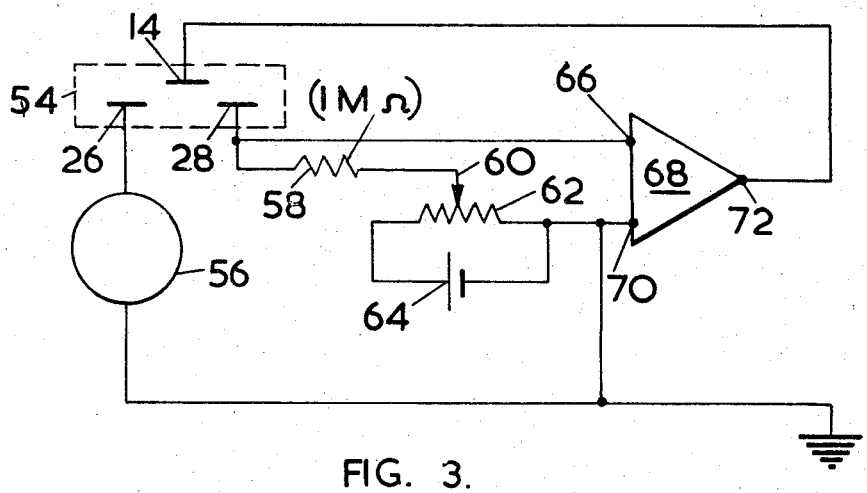
FIG. 3 illustrates an electrical circuit suitable for use in conjunction with the cells of FIG. 1 and FIG. 2.
Figure 4:
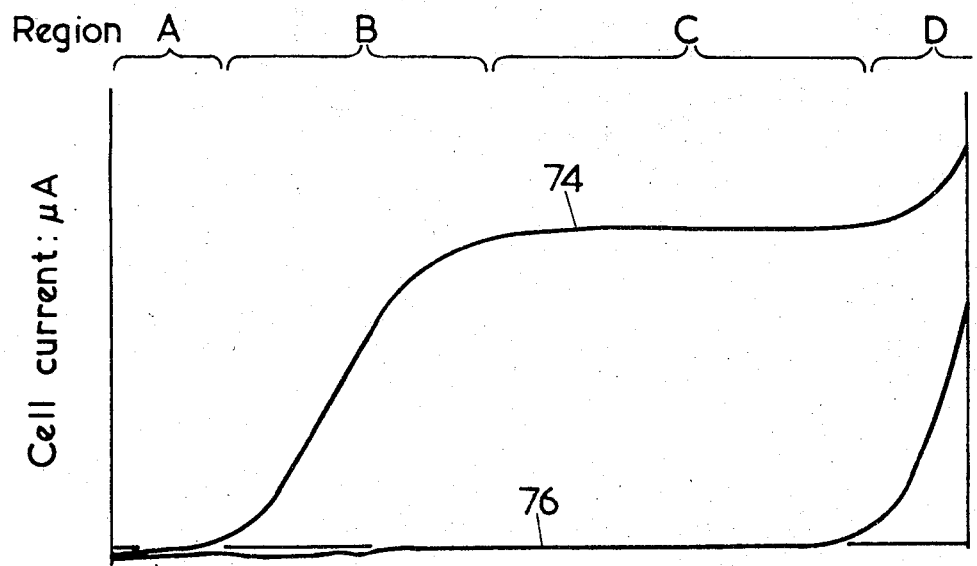

If an active substance is introduced into the gas in contact with the detecting electrode 26A, the magnitude of the electrical current flowing through the detecting electrode 26A will be altered. If there is no active species in the reference gas, then the electrical current flowing through the compensating electrode 28A will depend entirely on the applied electrical potential, and the increase in the current flowing through electrode 26A will give a measure of the concentration of the active species, as measured by instrument 56 (FIG. 3).

If the reference gas contains a known concentration of active species, then the increase in the current flowing through the detecting electrode 26A will depend on the difference between the concentrations of active species in the gas being monitored and in the reference gas, and on the relative sensitivities of the two electrodes to the active species.

If and only if the cell shown in FIG. 1 is to be used with a reference gas containing a known concentration of active species, then the two electrodes of the cell must be matched as to current output per unit concentration of active species.

Figure 2:
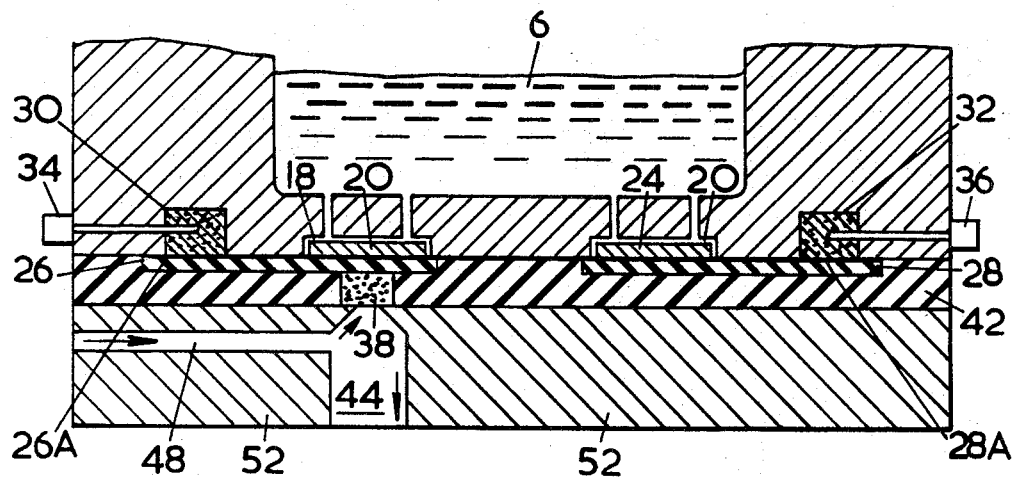
FIG. 2 illustrates a section through a second embodiment of a gas-monitoring polarographic cell.

FIG. 2 illustrates an alternative cell construction which differs from that shown in FIG. 1 in that only one porous plug 38, passage 44 and gas inlet passage 48 are provided. The lower surface of the second metallised membrane 28 is in contact only with the rubber gasket 42.

In operation, the gas being monitored is caused to flow through the passages 48, 44 and to diffuse through the plug 38 to the detecting electrode 26A. If the gas contains an active species the difference between the currents flowing through the detecting and compensating electrodes 26, 28, will be increased or decreased, depending on the concentration of the active species in the gas being monitored.

In FIG. 3 a polarographic gas monitoring cell illustrated diagrammatically at reference 54 contains a detecting electrode 26, a compensating electrode 28 and a counter electrode 14. The detecting electrode 26 is electrically connected to earth through a low-current meter 56, across which the voltage drop is negligible. The compensating electrode 28 is connected through a resistor 58 of value 1MΩ to the tapping point 60 of a potentiometer 62 across which is connected an electrical source 64 of value 100mV. The compensating electrode 28 is also connected to the first inverting input 66 of an operational amplifier 68, which is a field effect transistor operational amplifier such as an "Ancom" (Registered Trade Mark) amplifier. The second input 70 of the amplifier 68 is connected to earth and to one end of potentiometer 62. The output 72 of the operational amplifier 68 is connected to the counter electrode 14.

In operation, the operational amplifier 68, (if suitably nulled), will tend by means of its output voltage at 72 to keep at zero the input voltage difference between inputs 66 and 70. A voltage difference has, however, been imposed between points 60 and 70 by means of the battery 64 and potential-dividing potentiometer 62. The operational amplifier will tend to oppose this voltage by driving a current through the resistance 58. This means that an essentially constant current will be driven through compensating electrode 28 to the counter electrode 14. The current measuring device 56 is made to drop a negligible voltage, which can be done with the aid of a second operational amplifier circuit, so that the detecting electrode 26 is at essentially the same potential as the compensating electrode 28. In the absence of active species reaching the detecting electrode 26 therefore it will also carry essentially the same current as the compensating electrode 28. This will hold even for changes in temperature, as the potential of the counter electrode will automatically be regulated to keep the current through the compensating electrode 28 constant.

The values of the potentiometer 62 and the source 64 may be chosen so that the compensating electrode current is smaller than the current due to the active substance; any significant change in detecting electrode current is therefore easily detected and measured. For example, for a carbon monoxide concentration of 500 ppm, a 3 microns thick polytetrafluoroethylene circular detecting electrode 10 mm diameter would provide current of about 100 nanoamps at 20°C and it would be appropriate to maintain the compensating electrode current at about 10 nanoamps.

Alternatively, the values of the potentiometer 62 and the source 64 may be chosen so that the current through the compensating electrode 28 is of the same order as or larger than the current due to the active substance; it is sometimes found that the current through the compensating electrode 28 is more stable in such circumstances. For the detecting electrode described above, and 500 ppm of carbon monoxide providing a current of 100 nanoamps, the current through the compensating electrode could be arranged to be 100 nanoamps. Or for the same electrode and 20 ppm carbon monoxide, providing a 4 nanoamps current through the detecting electrode, a 10 nanoamp compensating electrode current could be used.

If zero current through the electrode 28 is required, then the potentiometer 62 and source 64 may be omitted. Also, the circuit may be arranged so that the background current is either cathodic or anodic; one arrangement may be found to be more stable than the other.

Alternatively the magnitude of the current may be chosen so that the cell is working in the plateau region, or so that the working electrodes maintain their catalytic activity.

The direction of the current may be chosen to prevent undesirable reactions in the cell. For example, an oxidation reaction may be chosen to prevent deposition on the electrodes of metallic impurities in the electrolyte solution.

As an alternative to the embodiments illustrated in FIGS. 1 and 2, a polarographic cell could be provided with detachable units comprising a working electrode assembly and optionally a gas inlet which could be plugged into the body of the cell containing the electrolyte reservoir and counter electrode.

The choice of metal for the working electrodes depends upon the fluid being monitored. for example, if the active substance is carbon monoxide gas then the first and second working electrodes are preferably platinum/palladium or platinum/ruthenium and the counter electrode platinum. If the active substance is oxygen, then the first and second working electrodes are preferably silver and gold and the counter electrode is preferably gold.

We claim:

1. An electrochemical monitoring system for detecting the presence of active substance in a fluid, consisting of an electrochemical cell having first and second metalized membrane working electrodes, a counter electrode and, in use, an electrolyte, the first and second working electrodes and the counter electrode adapted to contact the electrolyte, the first working electrode also capable of being exposed to said fluid, whereby in the absence of an active substance substantially identical background currents flow between the counter electrode and the first working electrode and between the counter electrode and the second working electrode, electrical measuring means for measuring the electrical current through said first working electrode, and electrical feedback means for automatically adjusting the potential of the counter electrode such that the current through the second working electrode is maintained at a substantially constant magnitude, the background current through the first working electrode also maintained at a substantially constant magnitude.

2. An electrochemical monitoring system according to claim 1 in which the first working electrode is a detecting electrode at which an oxidisable substance in said fluid can be oxidised to provide an electric current of magnitude related to the concentration of said oxidisable substance in said fluid and which flows through said detecting electrode, and the second working electrode is a compensating electrode through which will flow any background current not related to the concentration of the oxidisable substance.

3. An electrochemical monitoring system according to claim 1 in which the first working electrode is a detecting electrode at which a reducible substance in said fluid can be reduced to provide an electric current of magnitude related to the concentration of said reducible substance in said fluid and which flows through said detecting electrode, and the second working electrode is a compensating electrode through which will flow any background current not related to the concentration of the reducible substance.

4. An electrochemical monitoring system according to claim 1 in which the second working electrode can be exposed to a reference fluid.

5. An electrochemical monitoring system according to claim 1 in which the electrochemical cell is arranged as a gas-monitoring cell.

6. An electrochemical monitoring system according to claim 1 in which the electrical feedback means includes an operational amplifier having a negative feedback circuit, the output of the amplifier being arranged to control an electrical potential applied to the counter electrode, and the differential input to the amplifier being derived from a resistor in series with the second working electrode, whereby substantially zero current passes through the second working electrode.

7. An electrochemical monitoring system according to claim 1 in which the electrical feedback means includes an operational amplifier having a negative feedback circuit, the output of the amplifier being arranged to control an electrical potential applied to the counter electrode, and the differential input to the amplifier being derived both from a resistor in series with the second working electrode and from a steady source of electrical potential arranged in opposition to the potential derived from said resistor, whereby a substantially steady current passes through the second working electrode.

8. An electrochemcial monitoring system according to claim 1 wherein the electrochemical cell is a polarographic cell.

9. An electrochemical monitoring system according to claim 1 wherein the electrochemical cell is a coulometric cell.

10. An electrochemical monitoring system according to claim 1 wherein the system includes only 3 electrodes.

11. An improved electrochemical monitoring system for detecting the presence of an active substance in a fluid including a unitary electrochemical cell provided with feedback means to automatically substantially completely compensate changes in background current therein, said system comprising:

a unitary electrochemical cell containing, in use, an electrolyte;

a metalized membrane detecting electrode in contact with said electrolyte adapted to be exposed to the fluid to be monitored;

a metalized membrane compensating electrode in contact with said electrolyte;

a counter electrode in contact with said electrolyte whereby in the absence of an active substance substantially identical background currents flow between the counter electrode and the detecting electrode and between the counter electrode and the compensating electrode;

electrical measuring means for measuring the electrical current through said detecting electrode;

an electrical feedback means for automatically adjusting the potential of the counter electrode such that the current through said compensating electrode is maintained at a substantially constant magnitude;

the monitoring system, in operation, maintaining background current in said system at a substantially constant magnitude, whereby background current unrelated to the monitoring of said active substance flows through said compensating electrode, and the electric current occurring at said detector electrode is of a magnitude related to the concentration of the active substance in said fluid.

* * * * *